US010763582B2

(12) United States Patent
Calmettes et al.

(10) Patent No.: US 10,763,582 B2
(45) Date of Patent: Sep. 1, 2020

(54) METHOD FOR DETERMINING A PHASE BIAS IN THE SIGNAL TRANSMITTED BY AT LEAST ONE OF THE RADIATING ELEMENTS OF AN ACTIVE ANTENNA, AND ASSOCIATED DEVICE

(71) Applicants: THALES, Courbevoie (FR); CENTRE NATIONAL D'ETUDES SPATIALES, Paris (FR)

(72) Inventors: Thibaud Calmettes, Toulouse (FR); Benoît Vautherin, Toulouse (FR); Yoan Gregoire, Pechabou (FR); Christelle Iliopoulos, Toulouse (FR)

(73) Assignees: THALES, Courbevoie (FR); CENTRE NATIONAL D'ETUDES SPATIALES, Paris (FR)

( * ) Notice: Subject to any disclaimer, the term of this patent is extended or adjusted under 35 U.S.C. 154(b) by 144 days.

(21) Appl. No.: 16/160,904

(22) Filed: Oct. 15, 2018

(65) Prior Publication Data
US 2019/0113594 A1    Apr. 18, 2019

(30) Foreign Application Priority Data
Oct. 16, 2017   (FR) ...................................... 17 01074

(51) Int. Cl.
H01Q 3/26     (2006.01)
H04B 17/12    (2015.01)

(52) U.S. Cl.
CPC ............. H01Q 3/267 (2013.01); H04B 17/12 (2015.01)

(58) Field of Classification Search
CPC ................................ H01Q 3/267; H04B 17/12
See application file for complete search history.

(56) References Cited

U.S. PATENT DOCUMENTS

2018/0175946 A1* 6/2018 Cheng .................... H04B 17/12

FOREIGN PATENT DOCUMENTS

EP          3 185 032 A1     6/2017

* cited by examiner

Primary Examiner — Bernarr E Gregory
Assistant Examiner — Fred H Mull
(74) Attorney, Agent, or Firm — Baker & Hostetler LLP

(57) ABSTRACT

A method for determining a phase bias in the signal transmitted by at least one of the radiating elements of an active antenna on the ground emitting signals into space using a space-division multiple access SDMA method, implementing a step, for each reference receiver, of comparing, to a threshold, the difference between the value of a measurement of the power received by each reference receiver and the sum, out of the radiating elements of the subset beamforming in the direction of the reference receiver, of the differences between the equivalent isotropically radiated power in the direction of the reference receiver and the free-space path loss of each radiating element of the subset.

10 Claims, 2 Drawing Sheets

METHOD FOR DETERMINING A PHASE BIAS IN THE SIGNAL TRANSMITTED BY AT LEAST ONE OF THE RADIATING ELEMENTS OF AN ACTIVE ANTENNA, AND ASSOCIATED DEVICE

CROSS-REFERENCE TO RELATED APPLICATIONS

This application claims priority to foreign French patent application No. FR 1701074, filed on Oct. 16, 2017, the disclosure of which is incorporated by reference in its entirety.

FIELD OF THE INVENTION

The invention relates to controlling the emission of signals with spatial division or spatial multiplexing, having the acronym SDMA for "Space-Division Multiple Access", from an active antenna on the ground into space.

BACKGROUND

One difficulty lies in effectively controlling phase and amplitude distortions of antennae and RF chains in substantially "open-loop" operation as, apart from the loss of the signal upon reception at satellites, there is not really a way of monitoring the quality of the emitted signal, and when the loss arises, it is not known a priori how to state which radiating element of the antenna is defective.

These problems are particularly pertinent for ground stations as, with the antenna being in open sky, temperature effects may affect the controlling of the radiation patterns, and in the context of SDMA multiple access (and not as ordinary TDMA access with beamforming each time), since all of the signals are then emitted at the same time. Ultimately, the radiation pattern has to be controlled up to a low elevation, which requires a high degree of control thereof.

To manage this, it is generally required to measure the radiation patterns of the radiating elements of the active antenna, before it is deployed, in a controlled laboratory environment, in an anechoic chamber.

The main difficulty is that making tests in an anechoic chamber are not necessarily representative, especially for active antennae equipped with a large number of radiating elements, typically greater than 20, which therefore require very large anechoic chambers, notably in order to take account of the effects of pressure and of temperature on them.

These solutions entail a high cost, not only for using an anechoic chamber, but also for choosing technologies that are relatively insensitive (for example to temperature) in order to facilitate this calibration.

SUMMARY OF THE INVENTION

One aim of the invention is to overcome the aforementioned problems.

Therefore, what is proposed, according to one aspect of the invention, is a method for determining a phase bias in the signal transmitted by at least one of the radiating elements of an active antenna on the ground emitting signals into space using a space-division multiple access SDMA method, the method comprising the steps of:

beamforming by way of dephased combination of the signals emitted by the radiating elements in the direction of each satellite of a set of satellites;

iteratively performing, over an interval of time, the steps of:

beamforming in the direction of each reference receiver of a set of reference receivers comprising between three and ten reference receivers on the ground around the active antenna, using a subset of at least three radiating elements of the radiating elements of the active antenna;

for each reference receiver, comparing, to a threshold, the difference between the value of a measurement of the power received by each reference receiver and the sum, out of the radiating elements of the subset beamforming in the direction of the reference receiver, of the differences between the equivalent isotropically radiated power in the direction of the reference receiver and the free-space path loss of each radiating element of the subset;

detecting a phase bias, when a difference is greater than the threshold, for a radiating element of the subset pointing at the corresponding reference receiver; and modifying the subsets of radiating elements pointing at the reference receivers, when a phase bias is detected, for as long as the radiating element having a phase bias is not determined.

Such a method makes it possible, for a low cost and in real time, to iteratively determine the presence of a phase bias in the signal transmitted by at least one of the radiating elements of an active antenna on the ground emitting signals into space using a space-division multiple access SDMA method.

According to one mode of implementation, when a phase bias is detected for a radiating element of a subset of radiating elements, the subsets of radiating elements respectively pointing at the reference receivers are modified such that the radiating elements of the subset in which the phase bias is detected are distributed over at least two modified subsets.

It is thus possible to determine, using the new subset in which the power is also degraded, to which initial subset the defective antenna element belonged, and thus, by dichotomy, to converge towards singling out the identification of the defective antenna element.

In one mode of implementation, the subsets of radiating elements respectively beamforming in the directions of the reference receivers are modified such that the radiating elements of the subset in which the phase bias is detected are distributed over at least two modified subsets respectively beamforming in the directions of reference receivers other than the reference receiver for which a phase bias of a radiating element has been detected.

Thus, the case of a problem on a reference receiver and not on an antenna radiating element may also be detected.

According to one mode of implementation, the reference receivers are evenly spatially distributed around the active antenna.

Thus, a large variety of the azimuth field of the radiating elements is covered, thereby making it possible to detect possible degradation in a particular azimuth subfield.

In one mode of implementation, the reference receivers are positioned with respect to the average plane of the active antenna such that their elevation angle is equal to a minimum elevation threshold starting from which the antenna has to be able to communicate with satellites, and at a distance from the antenna that is greater than ten times the maximum wavelength for communication with satellites.

The phases are thus monitored at the location where they are most likely to vary (at low elevation), and at the same time placing reference receivers above the horizon for communication with satellites, where they could impede the transmission of the payload signals, is avoided.

According to one mode of implementation, the number of radiating elements of the active antenna is greater than the sum of the number of satellites and of the maximum number of reference receivers in the directions in which beamforming is carried out simultaneously by one and the same antenna element.

Thus, the beamforming in the direction of the reference receivers, in addition to the pointing towards the satellites, is enabled by the degrees of freedom of the beamforming for the SDMA.

In one mode of implementation, the number of radiating elements of the active antenna is greater than 1.3 times the sum of the number of satellites and of the maximum number of reference receivers in the directions in which beamforming is carried out simultaneously by one and the same antenna element.

This makes it possible to have an additional margin of 30% for the degrees of freedom, so as to be able to add additional gain constraints if necessary to the beamforming (elimination of obstacles on the ground, controlling of array side lobes). There is thus a significant margin for said pointing, thereby possibly additionally making it possible to improve the beamforming, for example by avoiding pointing array side lobes in unwanted directions.

According to one mode of implementation, when a phase bias is detected on a radiating element, the value of said phase bias is modified incrementally, until identification of the phase bias value to be subtracted from said radiating element in order to recover all of the desired power on the reference receiver.

What is also proposed, according to another aspect of the invention, is a system for determining a phase bias in the signal transmitted by at least one of the radiating elements of an active antenna on the ground emitting signals into space using a space-division multiple access SDMA method, comprising at least three reference receivers positioned with respect to the average plane of the active antenna such that their elevation angle is equal to a minimum elevation threshold starting from which the antenna has to be able to communicate with satellites, and at a distance from the antenna that is greater than ten times the maximum wavelength for communication with satellites, and comprising an electronic control unit configured to implement the method according to the above description.

In one embodiment, the reference receivers are evenly spatially distributed around the active antenna.

BRIEF DESCRIPTION OF THE DRAWINGS

The invention will be better understood on studying a few embodiments described by way of completely non-limiting example and illustrated by the appended drawings, in which.

In the various figures, elements that have identical references are identical.

DETAILED DESCRIPTION

For ease of reference, the term "point" (to a satellite or to a receiver) will be used to signify "beamforming by dephased combination of the signals emitted in the direction of". Specifically, this corresponds to physically "pointing" a mobile parabolic antenna by focusing the maximum gain in this direction.

Figure 1:
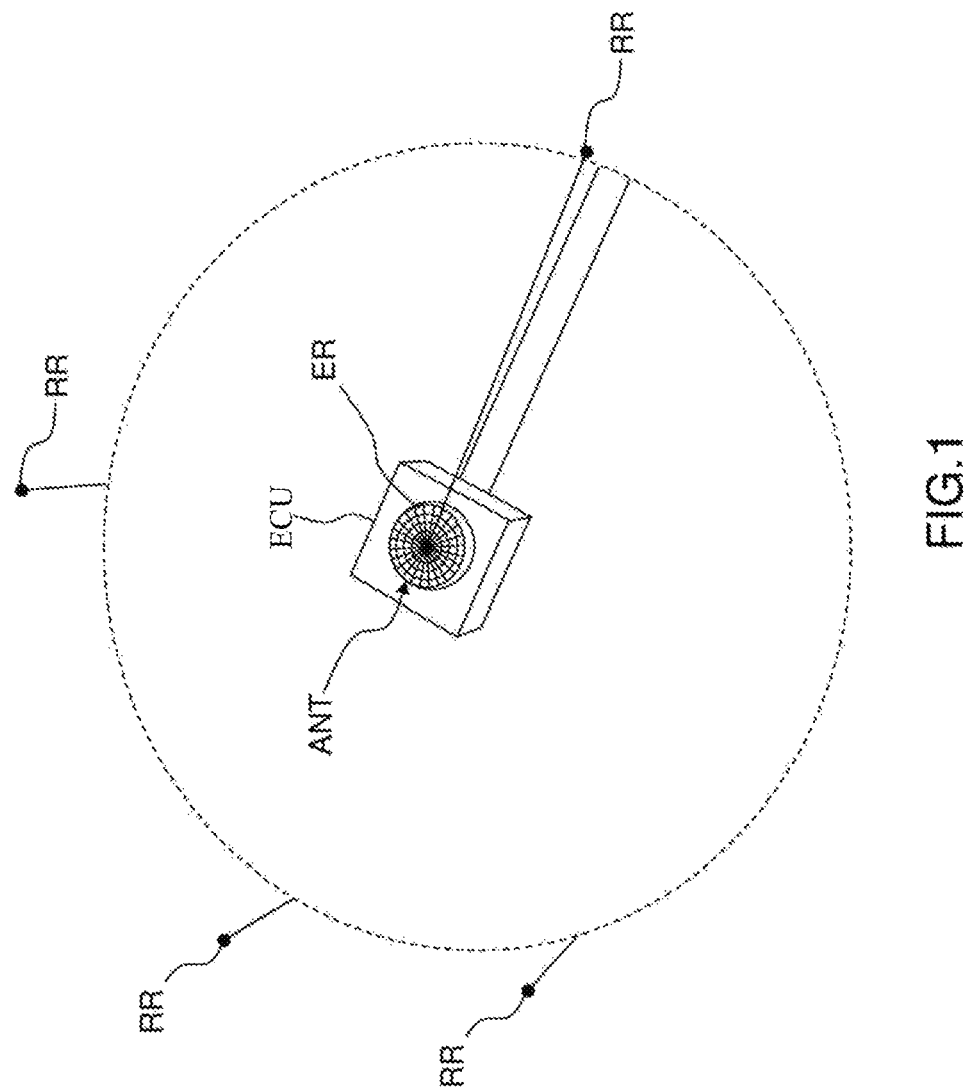
FIG. 1 schematically illustrates a system for determining a phase bias in the signal transmitted by at least one of the radiating elements of an active antenna on the ground emitting signals into space using a space-division multiple access SDMA method according to one aspect of the invention.

FIG. 1 shows a system for determining a phase bias in the signal transmitted by at least one of the radiating elements ER of an active antenna ANT on the ground emitting signals into space using a space-division multiple access SDMA method, intended for a set of satellites.

The system comprises at least three reference receivers RR positioned with respect to the average plane of the active antenna ANT such that their elevation angle is equal to a minimum elevation threshold starting from which the antenna has to be able to communicate with satellites, and at a distance from the antenna that is greater than ten times the maximum wavelength for communication with satellites.

The number N of radiating elements ER of the active antenna ANT is greater than the sum of the number of satellites M and of the maximum number of reference receivers RR simultaneously pointed at by one and the same antenna element.

The number N of radiating elements ER of the active antenna ANT is preferably greater than 1.3 times the sum of the number of satellites M and of the maximum number of reference receivers RR simultaneously pointed at by one and the same antenna element. This makes it possible to keep enough degrees of freedom to improve the quality of the SDMA pointing if necessary (removal of array side lobes, addition of unwanted additional pointing directions, etc.).

The system furthermore comprises an electronic control unit ECU configured to implement the method of the invention.

The reference receivers RR exchange data with the electronic control unit ECU by wired or wireless link.

The number of reference receivers RR is between 3 and 10, so as to maximize the determination of the phase bias in the signal transmitted by at least one of the radiating elements ER, while at the same time limiting cost and complexity, which increase with the number of reference receivers RR. In this case, FIG. 1 describes an embodiment using 4 reference receivers RR, this being a good compromise.

For example, the elevation angle of the reference receivers RR is 5°.

As a variant, the reference receivers RR may be evenly distributed around the antenna ANT, so as to ensure good calibration over a large azimuth field.

Figure 2:
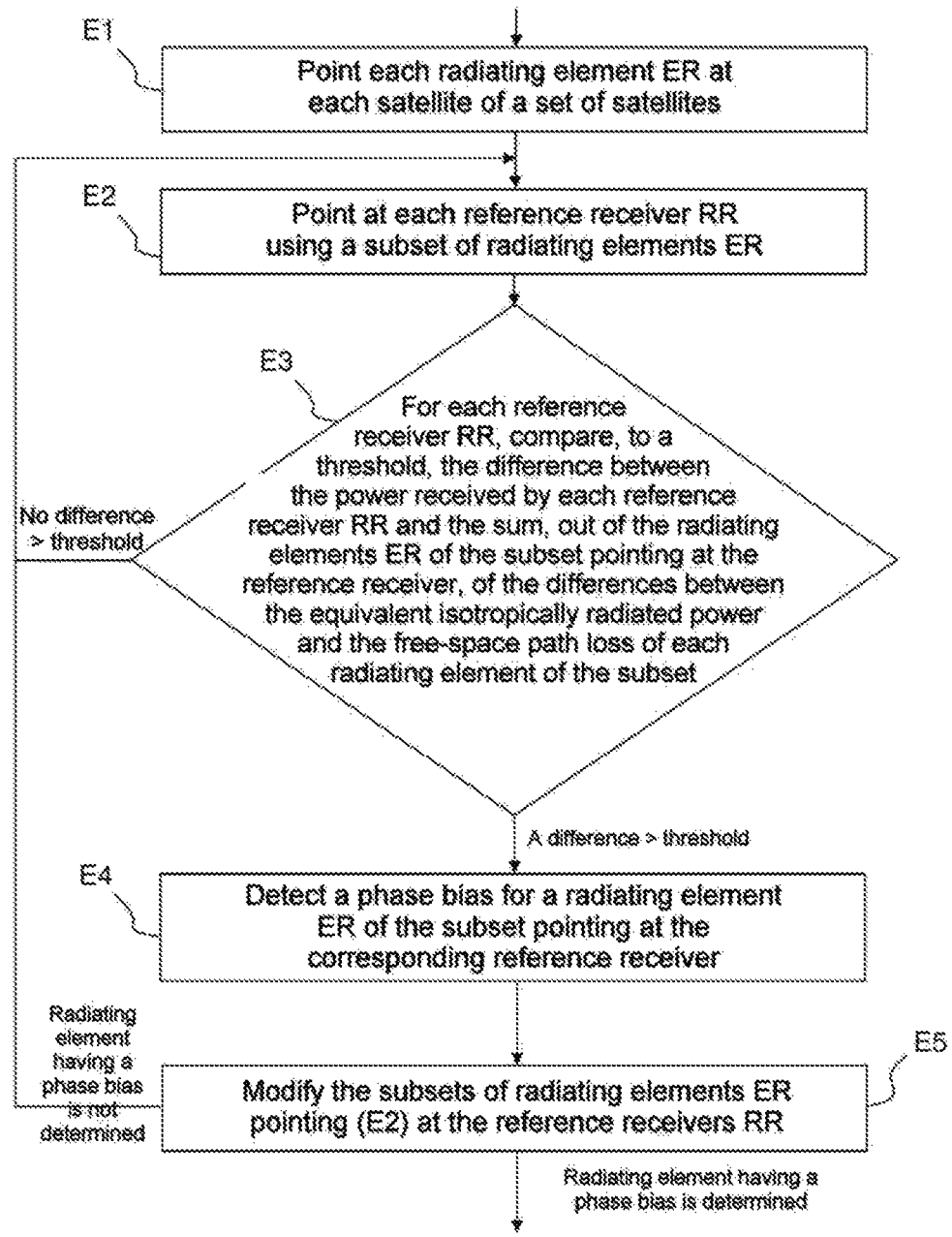
FIG. 2 schematically illustrates a method for determining a phase bias in the signal transmitted by at least one of the radiating elements of an active antenna on the ground emitting signals into space using a space-division multiple access SDMA method according to one aspect of the invention.

FIG. 2 shows a method for determining a phase bias in the signal transmitted by at least one of the radiating elements ER of an active antenna ANT on the ground emitting signals into space using a space-division multiple access SDMA method. The method comprises the steps of:

pointing E1 each radiating element ER at each satellite of a set of satellites;

iteratively performing, over an interval of time $\Delta t$, the steps of:

pointing E2 at each reference receiver RR of a set of reference receivers comprising between three and ten reference receivers on the ground around the active antenna ANT, using a subset of at least three radiating elements ER of the radiating elements ER of the active antenna ANT;

for each reference receiver RR, comparing, to a threshold, the difference between the value of a measurement of the power received by each reference receiver RR and the sum, out of the radiating elements ER of the subset pointing at the reference receiver RR, of the differences between the equivalent isotropically radiated power and the free-space path loss of each radiating element of the subset;

detecting a phase bias, when a difference is greater than the threshold, for a radiating element of the subset pointing at the reference receiver RR; and modifying the subsets of radiating elements ER pointing E2 at the reference receivers RR, when a phase bias is detected, for as long as the radiating element having a phase bias is not determined.

The subsets of radiating elements ER may be separate, and combining them may or may not be equal to all of the radiating elements ER.

The reference receivers RR are regularly or periodically pointed at, respectively, by subsets of radiating elements ER, as if they were additional satellites. These modifications of subsets of radiating elements ER may use deterministic permutations or adapt the pointing of the subsets of radiating elements ER to the determination of a phase bias on at least one radiating element ER of a subset using a successive elimination approach.

Thus, when a phase bias is detected for a radiating element of a subset of radiating elements, the subsets of radiating elements respectively pointing at the reference receivers RR are modified E5 such that the radiating elements of the subset in which the phase bias is detected are distributed over at least two modified subsets.

The following example uses, for example, an antenna ANT having 64 radiating elements ER, two satellites, and 4 reference receivers RR:

At the date $t_1$:
   64 radiating elements to point at satellite 1
   64 radiating elements to point at satellite 2
   Radiating elements 01 to 16 to point at reference receiver 1
   Radiating elements 17 to 32 to point at reference receiver 2
   Radiating elements 33 to 48 to point at reference receiver 3
   Radiating elements 49 to 64 to point at reference receiver 4
   Degradation Towards Reference Receiver 2 (Radiating Elements 17 to 32 Remain)

At the date $t_2$:
   64 radiating elements to point at satellite 1
   64 radiating elements to point at satellite 2
   Radiating elements 09 to 24 to point at reference receiver 1
   Radiating elements 25 to 50 to point at reference receiver 2
   Radiating elements 41 to 56 to point at reference receiver 3
   Radiating elements 57 to 64 and 01 to 08 to point at reference receiver 4
   Degradation Towards Reference Receiver 1 (Radiating Elements 17 to 24 Remain)

At the date $t_3$:
   64 radiating elements to point at satellite 1
   64 radiating elements to point at satellite 2
   Radiating elements 09 to 12, 24 to 28, 41 to 44, 57 to 60 to point at reference receiver 1
   Radiating elements 05 to 08, 21 to 23, 37 to 40, 53 to 56 to point at reference receiver 2
   Radiating elements 01 to 04, 17 to 20, 33 to 36, 49 to 52 to point at reference receiver 3
   Radiating elements 13 to 16, 29 to 32, 45 to 48, 61 to 64 to point at reference receiver 4
   Degradation Towards Reference Receiver 3 (Radiating Elements 17 to 20 Remain)

At the date $t_4$:
   64 radiating elements to point at satellite 1
   64 radiating elements to point at satellite 2
   Radiating elements 01, 02, 09, 10, 17, 18, 25, 26, 33, 34, 41, 42, 49, 50, 57, 58 to point at reference receiver 1
   Radiating elements 03, 04, 11, 12, 19, 20, 27, 28, 35, 36, 43, 44, 51, 52, 59, 60 to point at reference receiver 2
   Radiating elements 05, 06, 13, 14, 21, 22, 29, 30, 37, 38, 45, 46, 53, 54, 61, 62 to point at reference receiver 3
   Radiating elements 07, 08, 15, 16, 23, 24, 31, 32, 39, 40, 47, 48, 55, 56, 63, 64 to point at reference receiver 4
   Degradation towards reference receiver 2 (radiating elements 19 and 20 remain)

At the date $t_5$:
   64 radiating elements to point at satellite 1
   64 radiating elements to point at satellite 2
   Radiating elements 03, 07, 11, 15, 19, 23, 27, 31, 35, 39, 43, 47, 51, 55, 59, 63 to point at reference receiver 1
   Radiating elements 01, 05, 09, 13, 17, 21, 25, 29, 33, 37, 41, 45, 49, 53, 57, 61 to point at reference receiver 2
   Radiating elements 02, 06, 10, 14, 18, 22, 26, 30, 34, 38, 42, 46, 50, 54, 58, 62 to point at reference receiver 3
   Radiating elements 04, 08, 12, 16, 20, 24, 28, 32, 36, 40, 44, 48, 52, 56, 60, 64 to point at reference receiver 4
   Degradation Towards Reference Receiver 4 (Radiating Element 20 Remains)

A phase bias in the signal transmitted by the radiating element ER referenced 20 is thus identified.

As is seen in the above example, an important point for converging towards the faulty element is the sequence from one step to the next one. Specifically, in this example, it was known that there was a defective element among elements 17 to 32 (16 possible elements) at the date $t_1$, and the step at date $t_2$ made it possible to see whether this defective element was among elements 17 to 24 (degradation on receiver 1, as was observed), or whether this defective element was among elements 25 to 32 (there would have been a degradation on receiver 2), and in any case there were therefore 8 remaining unknowns, and the number of unknowns was therefore divided by 2. The main defect with this approach is that there is in no case a risk of observing the fault seen at $t_1$ on receiver 1 on receivers 3 or 4 at $t_2$. In other words, it would have been possible to ensure that the 16 possible elements at the date $t_1$ were distributed into 4 portions of 4 elements on each of the 4 reference receivers at the date $t_2$, and there would therefore have been a division of the number of antennae still to be tested by 4.

Generally, "homogeneous" is the name that will be given to a division such that the antennae to be investigated in a step $t_K$ are distributed homogeneously between the reference receivers in step $t_{K+1}$.

The above distribution was therefore "inhomogeneous". A trivial "inhomogeneous" distribution may also be used to refer to a distribution that involves considering antennae 1 to 16 for receiver 1 in step 1, and then antennae 2 to 17 in step 2, and then antennae 3 to 18 in step 3, etc. In the worst case, it may take 16 steps to find the faulty antenna, and on average it will take 8.

An example with successive "homogeneous" distributions is given below:

At the date $t_1$:
- 64 radiating elements to point at satellite 1
- 64 radiating elements to point at satellite 2
- Radiating elements 01 to 16 to point at reference receiver 1
- Radiating elements 17 to 32 to point at reference receiver 2
- Radiating elements 33 to 48 to point at reference receiver 3
- Radiating elements 49 to 64 to point at reference receiver 4

Degradation Towards Reference Receiver 2 (Radiating Elements 17 to 32 Remain)

At the date $t_2$:
- 64 radiating elements to point at satellite 1
- 64 radiating elements to point at satellite 2
- Radiating elements 01, 02, 03, 04, 17, 18, 19, 20, 33, 34, 35, 36, 49, 50, 51, 52 to point at reference receiver 1
- Radiating elements 05, 06, 07, 08, 21, 22, 23, 24, 37, 38, 39, 40, 53, 54, 55, 56 to point at reference receiver 2
- Radiating elements 09, 10, 11, 12, 25, 26, 27, 28, 41, 42, 43, 44, 57, 58, 59, 60 to point at reference receiver 3
- Radiating elements 13, 14, 15, 16, 29, 30, 31, 32, 45, 46, 47, 48, 61, 62, 63, 64 to point at reference receiver 4

Degradation Towards Reference Receiver 1 (Radiating Elements 17, 18, 19 and 20 Remain)

At the date $t_3$:
- 64 radiating elements to point at satellite 1
- 64 radiating elements to point at satellite 2
- Radiating elements 01, 05, 09, 13, 17, 21, 25, 29, 33, 37, 41, 45, 49, 53, 57, 61 to point at reference receiver 1
- Radiating elements 02, 06, 10, 14, 18, 22, 26, 30, 34, 38, 42, 46, 50, 54, 58, 62 to point at reference receiver 2
- Radiating elements 03, 07, 11, 15, 19, 23, 27, 31, 35, 39, 43, 47, 51, 55, 59, 63 to point at reference receiver 3
- Radiating elements 04, 08, 12, 16, 20, 24, 28, 32, 36, 40, 44, 48, 52, 56, 60, 64 to point at reference receiver 4

Degradation Towards Reference Receiver 4 (Radiating Element 20 Remains)

Using this "homogeneous" approach in the transitions between steps, we have therefore moved from 5 necessary steps to just 3.

Generally, in a "homogeneous" approach, the number of steps is given by a conventional logarithmic law (the logarithm of the number of elements divided by the logarithm of the number of receivers, rounded up), namely in this case $\ln(64)/\ln(4)=3$.

Another advantageous implementation may involve minimizing the differences, as follows:

At the date $t_1$:
- 64 radiating elements to point at satellite 1
- 64 radiating elements to point at satellite 2
- Radiating elements 01 to 16 to point at reference receiver 1
- Radiating elements 02 to 17 to point at reference receiver 2
- Radiating elements 03 to 18 to point at reference receiver 3
- Radiating elements 04 to 19 to point at reference receiver 4

At the date $t_2$ (for example 2 seconds later)
- 64 radiating elements to point at satellite 1
- 64 radiating elements to point at satellite 2
- Radiating elements 05 to 20 to point at reference receiver 4
- Radiating elements 06 to 21 to point at reference receiver 3
- Radiating elements 07 to 22 to point at reference receiver 2
- Radiating elements 08 to 23 to point at reference receiver 1

At the date $t_3$ (for example 2 seconds later)
- 64 radiating elements to point at satellite 1
- 64 radiating elements to point at satellite 2
- Radiating elements 09 to 24 to point at reference receiver 1
- Radiating elements 10 to 25 to point at reference receiver 2
- Radiating elements 11 to 26 to point at reference receiver 3
- Radiating elements 12 to 27 to point at reference receiver 4

At the date $t_4$ (for example 2 seconds later)
- 64 radiating elements to point at satellite 1
- 64 radiating elements to point at satellite 2
- Radiating elements 13 to 28 to point at reference receiver 4
- Radiating elements 14 to 29 to point at reference receiver 2
- Radiating elements 15 to 30 to point at reference receiver 3
- Radiating elements 16 to 31 to point at reference receiver 1

At the date $t_5$ (for example 2 seconds later)
- 64 radiating elements to point at satellite 1
- 64 radiating elements to point at satellite 2
- Radiating elements 17 to 32 to point at reference receiver 1
- Radiating elements 18 to 33 to point at reference receiver 3
- Radiating elements 19 to 34 to point at reference receiver 2
- Radiating elements 20 to 35 to point at reference receiver 4

In this example, degradation on references 3 and 4 between $t_1$ and $t_2$, and then on all of the references between $t_2$ and $t_5$, and then on references 1 and 3 after $t_5$, makes it possible to identify degradation on radiating element 18.

Regardless of the chosen permutation, in particular the size of the subsets of radiating elements ER, the times spent per observation and the modifications E5 of subsets are selected depending on the characteristics that it is desired to observe.

The modification E5 is thus dimensioned by:
- the required power precision levels: a degradation of $\frac{1}{16}$th of the antennae used by the subarray is reflected in a degradation of $10 \cdot \log(15/16) = -0.28$ dB, and therefore requires a long enough observation time to allow a more accurate power measurement. It is thus necessary to avoid using all of the radiating elements ER, as detecting the fault with just one of them then becomes difficult and lengthy;
- the number of radiating elements ER necessary for homogeneous pointing: to avoid a variation in power as a function of the subarrays that are used, there must be enough elements to ensure that the received power remains the same, or in any case that it is controlled enough to be able to continue to observe distortions. There is therefore a minimum size of 7 radiating elements for subsets.

It is beneficial to vary the pointing towards the reference receivers RR that are used by the subsets of radiating elements so as to ensure that the degradation effects are actually observable on all of the references, and are not dependent thereon.

What is important is not reaching the point of deciding on the antenna to be corrected without having excluded the scenario that the problem is with a reference receiver RR. Thus, degradations observed on the same reference receiver RR in each step no longer correspond to any radiating element ER of the antenna ANT. For example, it there is assumed to be a degradation at each step on reference 1, this gives:

At the date $t_1$:
64 radiating elements to point at satellite 1
64 radiating elements to point at satellite 2
Radiating elements 01 to 16 to point at reference receiver 1
Radiating elements 17 to 32 to point at reference receiver 2
Radiating elements 33 to 48 to point at reference receiver 3
Radiating elements 49 to 64 to point at reference receiver 4
Degradation Towards Reference Receiver 1 (Radiating Elements 01 to 16 or Reference Receiver 1 Remain)

At the date $t_2$:
64 radiating elements to point at satellite 1
64 radiating elements to point at satellite 2
Radiating elements 09 to 24 to point at reference receiver 1
Radiating elements 25 to 50 to point at reference receiver 2
Radiating elements 41 to 56 to point at reference receiver 3
Radiating elements 57 to 64 and 01 to 08 to point at reference receiver 4
Degradation Towards Reference Receiver 1 (Radiating Elements 09 to 16 or Reference Receiver 1 Remain)

At the date $t_3$:
64 radiating elements to point at satellite 1
64 radiating elements to point at satellite 2
Radiating elements 09 to 12, 24 to 28, 41 to 44, 57 to 60 to point at reference receiver 1
Radiating elements 05 to 08, 21 to 23, 37 to 40, 53 to 56 to point at reference receiver 2
Radiating elements 01 to 04, 17 to 20, 33 to 36, 49 to 52 to point at reference receiver 3
Radiating elements 13 to 16, 29 to 32, 45 to 48, 61 to 64 to point at reference receiver 4
Degradation Towards Reference Receiver 1 (Radiating Elements 09 to 12 or Reference Receiver 1 Remain)

At the date $t_4$:
64 radiating elements to point at satellite 1
64 radiating elements to point at satellite 2
Radiating elements 01, 02, 09, 10, 17, 18, 25, 26, 33, 34, 41, 42, 49, 50, 57, 58 to point at reference receiver 1
Radiating elements 03, 04, 11, 12, 19, 20, 27, 28, 35, 36, 43, 44, 51, 52, 59, 60 to point at reference receiver 2
Radiating elements 05, 06, 13, 14, 21, 22, 29, 30, 37, 38, 45, 46, 53, 54, 61, 62 to point at reference receiver 3
Radiating elements 07, 08, 15, 16, 23, 24, 31, 32, 39, 40, 47, 48, 55, 56, 63, 64 to point at reference receiver 4
Degradation Towards Reference Receiver 1 (Radiating Elements 09 and 10 or Reference Receiver 1 Remain)

At the date $t_5$:
64 radiating elements to point at satellite 1
64 radiating elements to point at satellite 2
Elements 03, 07, 11, 15, 19, 23, 27, 31, 35, 39, 43, 47, 51, 55, 59, 63 to point at reference receiver 1
Radiating elements 01, 05, 09, 13, 17, 21, 25, 29, 33, 37, 41, 45, 49, 53, 57, 61 to point at reference receiver 2
Radiating elements 02, 06, 10, 14, 18, 22, 26, 30, 34, 38, 42, 46, 50, 54, 58, 64 to point at reference receiver 3
Radiating elements 04, 08, 12, 16, 20, 24, 28, 32, 36, 40, 44, 48, 52, 56, 60, 62 to point at reference receiver 4
Degradation Towards Reference Receiver 1 (this is Therefore a Problem on Reference Receiver 1 as there is No Longer a Common Antenna)

When a fault is detected with a radiating element ER of the antenna ANT, the most obvious strategy is to turn it off or disconnect it, simply to avoid degradation of the beamforming to the satellites. Specifically, turned-off radiating elements ER degrade the emission power, in proportion to the number of turned-off radiating elements. For example, if 63 elements are used rather than 64, $10*\log(63/64)=-0.07$ dB are lost, which may be entirely acceptable in terms of the link budget. By authorizing periods of regular maintenance, it is possible to tolerate loss of a certain number of radiating elements before changing several of them at once.

One strategy to be preferred may be that of artificially varying the phase bias (and possibly the amplitude) of the radiating element in an arbitrary manner, for example by increments of 1°, until the degradations in the subsets of radiating elements that are using it disappear. This arbitrarily applied phase bias is then retained for all instances of use of this antenna, in particular when pointing towards satellites. Since the level of degradation over all of the radiating elements ER of a single antenna is low, there is some time to perform this recalibration (typically until the next fault), and there is therefore an effective automatic self-correction means, still using the same monitoring technique on the reference receivers, by switching between subsets of radiating elements.

The subsets of radiating elements respectively pointing at the reference receivers RR may be modified E5 such that the radiating elements ER of the subset in which the phase bias is detected are distributed over at least two modified subsets respectively pointing at reference receivers RR other than the reference receiver RR for which a phase bias of a radiating element has been detected.

The main advantage of the present invention is that it makes it possible to respond to the problem of low-cost calibration, notably in terms of maintenance (only fixed elements RR and RE). It is highly flexible, since, by virtue of the subsets, of the durations between the subset modifications and the permutations themselves, it is possible to select the desired level of observability. The self-correction method outlined above is also a beneficial advantage. In addition, the reception by the reference elements may also be used to verify the quality of the emitted signal, and not just of the pointing by the SDMA, and therefore to offer continuous monitoring of the pointing. Lastly, it is important to note that the solution does not require any modification in terms of the satellite, which may behave as if the ground emission were from a parabola.

The invention claimed is:
1. A method for determining a presence of a phase bias in a signal transmitted by a radiating element of radiating elements of an active antenna on the ground emitting signals into space using a space-division multiple access SDMA method, the method comprising the steps of:

beamforming by way of dephased combination of the signals emitted by the radiating elements in the direction of each satellite of a set of satellites;

iteratively performing, over an interval of time ($\Delta t$), the steps of:

beamforming in the direction of each reference receiver of a set of reference receivers comprising between three and ten reference receivers on the ground around the active antenna, using a subset of at least three radiating elements of the radiating elements of the active antenna;

for each reference receiver, comparing, to a threshold, the difference between the value of a measurement of the power received by each reference receiver and the sum, out of the radiating elements of the subset beamforming in the direction of the reference receiver, of the differences between the equivalent isotropically radiated power in the direction of the reference receiver and the free-space path loss of each radiating element of the subset;

detecting the presence of the phase bias, when the difference is greater than the threshold, for a radiating element of the subset pointing at a corresponding reference receiver; and modifying the subsets of radiating elements pointing at the reference receivers, when a phase bias is detected, when the radiating element having the phase bias is not determined.

2. The method of claim 1, wherein, when the presence of the phase bias is detected to correspond to a radiating element of a subset of radiating elements, the subsets of radiating elements respectively beamforming in the directions of the reference receivers are modified such that the radiating elements of the subset in which the phase bias is detected are distributed homogeneously over the modified subsets.

3. The method according to claim 2, wherein the subsets of radiating elements respectively beamforming in the directions of the reference receivers are modified such that the radiating elements of the subset in which the phase bias is detected are distributed over at least two modified subsets respectively beamforming in the directions of reference receivers other than the reference receiver for which a phase bias of a radiating element has been detected.

4. The method according to claim 1, wherein the reference receivers are evenly spatially distributed around the active antenna.

5. The method according to claim 1, wherein the reference receivers are positioned with respect to the average plane of the active antenna such that their elevation angle is equal to a minimum elevation threshold starting from which the antenna has to be able to communicate with satellites, and at a distance from the antenna that is greater than ten times the maximum wavelength for communication with satellites.

6. The method according to claim 1, wherein the number of radiating elements of the active antenna is greater than the sum of the number of satellites and of the maximum number of reference receivers in the directions in which beamforming is carried out simultaneously by one and the same antenna element.

7. The method according to claim 6, wherein the number of radiating elements of the active antenna is greater than 1.3 times the sum of the number of satellites and of the maximum number of reference receivers in the directions in which beamforming is carried out simultaneously by one and the same antenna element.

8. The method of claim 1, wherein, when the presence of the phase bias is detected to correspond to a radiating element, the value of said phase bias is modified incrementally, until identification of the phase bias value to be subtracted from said radiating element in order to recover all of the desired power on the reference receiver.

9. A system for determining a presence of a phase bias in a signal transmitted by a radiating element of radiating elements of an active antenna on the ground emitting signals into space using a space-division multiple access SDMA method, comprising at least three reference receivers positioned with respect to the average plane of the active antenna such that their elevation angle is equal to a minimum elevation threshold starting from which the antenna has to be able to communicate with satellites, and at a distance from the antenna that is greater than ten times the maximum wavelength for communication with satellites, and comprising an electronic control unit configured to implement the method according to claim 1.

10. The system according to claim 9, wherein the reference receivers are evenly spatially distributed around the active antenna.

* * * * *